United States Patent [19]

Iijima et al.

[11] Patent Number: 4,706,989
[45] Date of Patent: Nov. 17, 1987

[54] REAR INDEPENDENT SUSPENSION FOR AUTOMOTIVE VEHICLE

[75] Inventors: Yoshitaka Iijima; Hiroshi Noguchi, both of Atsugi, Japan

[73] Assignee: Nissan Motor Co., Ltd., Japan

[21] Appl. No.: 871,482

[22] Filed: Jun. 6, 1986

[30] Foreign Application Priority Data

Jun. 12, 1985 [JP] Japan .................................. 60-127476
Jun. 15, 1985 [JP] Japan ............................. 60-90464[U]

[51] Int. Cl.⁴ ............................................... B60G 3/00
[52] U.S. Cl. ..................................... 280/701; 180/140; 280/91; 280/675; 280/676
[58] Field of Search ................. 280/701, 91, 675, 696; 180/140

[56] References Cited

U.S. PATENT DOCUMENTS

| 4,440,254 | 4/1984 | Shibahata et al. | 180/140 |
| 4,519,627 | 5/1985 | Shibahata et al. | 280/701 |
| 4,534,435 | 8/1985 | Shibahata et al. | 180/140 |
| 4,545,602 | 10/1985 | Shibahata | 280/701 |

FOREIGN PATENT DOCUMENTS

| 1937320 | 7/1972 | Fed. Rep. of Germany. | |
| 3139792 | 4/1983 | Fed. Rep. of Germany. | |
| 3438280 | 5/1985 | Fed. Rep. of Germany. | |
| 55-1556 | 1/1980 | Japan. | |
| 58-70911 | 5/1983 | Japan. | |
| 59-67170 | 4/1984 | Japan | 280/91 |

OTHER PUBLICATIONS

Patents Abstract of Japan, 60-92907 9/25/85, vol. 9/No. 238.

Primary Examiner—John J. Love
Assistant Examiner—Kenneth R. Rice
Attorney, Agent, or Firm—Leydig, Voit & Mayer

[57] ABSTRACT

In order to enable the appropriate amount of understeer to be produced in a suspension wherein the rear wheel is steered to produce a toe-in effect by a lateral rod/knuckle arm arrangement, a device which in some embodiments is hydraulically controlled and in others is mechanical, permits distortion of the elastomeric bushes which form part of the suspension unit to produce a relatively large amount of understeer at high speeds and restricts the distortion at lower speeds to reduce the amount of understeer to a level suitable for that speed.

10 Claims, 13 Drawing Figures

REAR INDEPENDENT SUSPENSION FOR AUTOMOTIVE VEHICLE

BACKGROUND OF THE PRESENT INVENTION

1. Field of the Invention

The present invention relates generally to a suspension for an automotive vehicle or the like and more specifically to a suspension which includes an arrangement for modifying the effects of compliance steer on the operational characteristics of the suspension.

2. Description of the Prior Art

FIG. 1 shows an arrangement disclosed in Japanese Utility Model Application First Provisional Publication No. 55-1556 (publication date Jan. 8, 1980) which is directed to compensating for the effects of the so called "compliance steer" phenomenon by varying the angle of the road wheel with respect to the longitudinal axis of the vehicle chassis. Viz., with the provision of a lateral rod and a knuckle arm, the road wheel which is pivotally mounted on pivot is "steered" from the orientation shown in solid line to that shown in chain line to convert compliance steering into "toe in". This feature induces understeer which produces a stabilizing effect under high speed cornering.

However, the amount of understeer which is derived from converting the complicance steer in a manner as set forth above is determined largely by the nature of the elastomer used in the bushes through which the suspension arm is connected to the vehicle chassis (viz., the bushes of the hinge units). Hence, the amount of understeer which is produced tends to remain essentially constant over the whole range of vehicle speed.

Thus, if the elastomer is selected in a manner to produce the appropriate amount of understeer at high vehicle speeds, the bushes tend to be overly soft and permit an excessive amount of understeer at lower speeds and vice versa. Hence, with the above described suspension it has not been possible to achieve ideal operational characteristics over the full range of vehicle speeds.

SUMMARY OF THE INVENTION

It is an object of the present invention to provide a control arrangement in combination with the type of suspension shown in FIG. 1 which modifies the characteristics of the arrangement in a manner which enables the generation of the appropriate amount of understeer at all vehicle speeds.

In brief, the above objects are achieved by an arrangement wherein, in order to enable the appropriate amount of understeer to be produced in a suspension wherein the rear wheel is steered to produce a toe-in effect by a lateral rod/knuckle arm arrangement, a device which in some embodiments is hydraulically controlled and in others is mechanical, permits the amount of distortion of the elastomeric bushes which form part of the suspension unit to a degree suitable for producing a relatively large amount of understeer at high speeds and which restricts the distortion at lower speeds to reduce the amount of understeer to a level suitable for that speed.

More specifically, the present invention takes the form of a rear suspension for a vehicle having a chassis which comprises: a suspension arm; hinge means for interconnecting the suspension arm to the chassis, the hinge means including an elastomeric bush which distorts when the vehicle is subject to a lateral acceleration; a lateral rod pivotally connected with the chassis; a knuckle arm pivotally connected to the outboard end of the lateral rod; a single on which a road wheel is supported; means for pivotally mounting the spindle on the suspension arm; the knuckle arm being connected to the pivotally mounting means for varying the orientation of the spindle with respect to the chassis upon the vehicle being subject to a lateral acceleration in a manner which steers the road wheel; a sensor responsive to a vehicle operational parameter; and means responsive to the sensor for modifying the deflection of the elastomeric bush and thus varying the steering of the road wheel by the lateral rod and the knuckle arm.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PRESENT INVENTION

Figure 2:
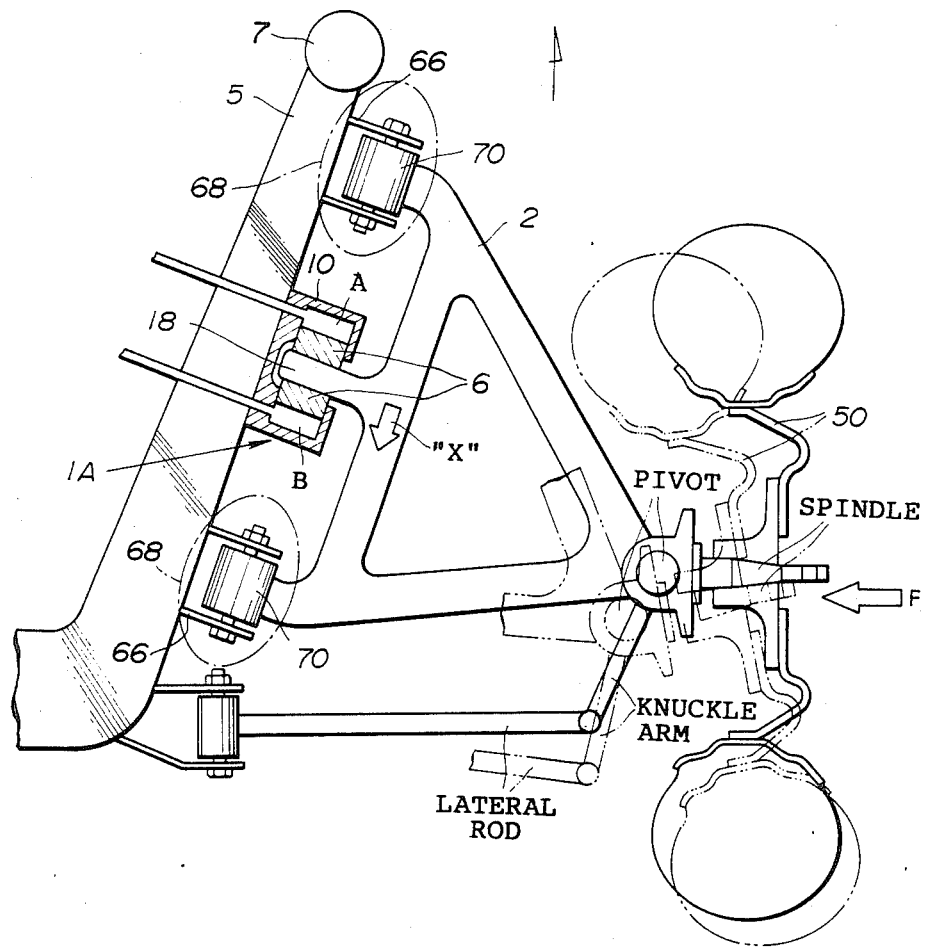
FIG. 2 is a partially sectioned plan view of a suspension arrangement which incorporates a first embodiment of the present invention.
Figure 4:
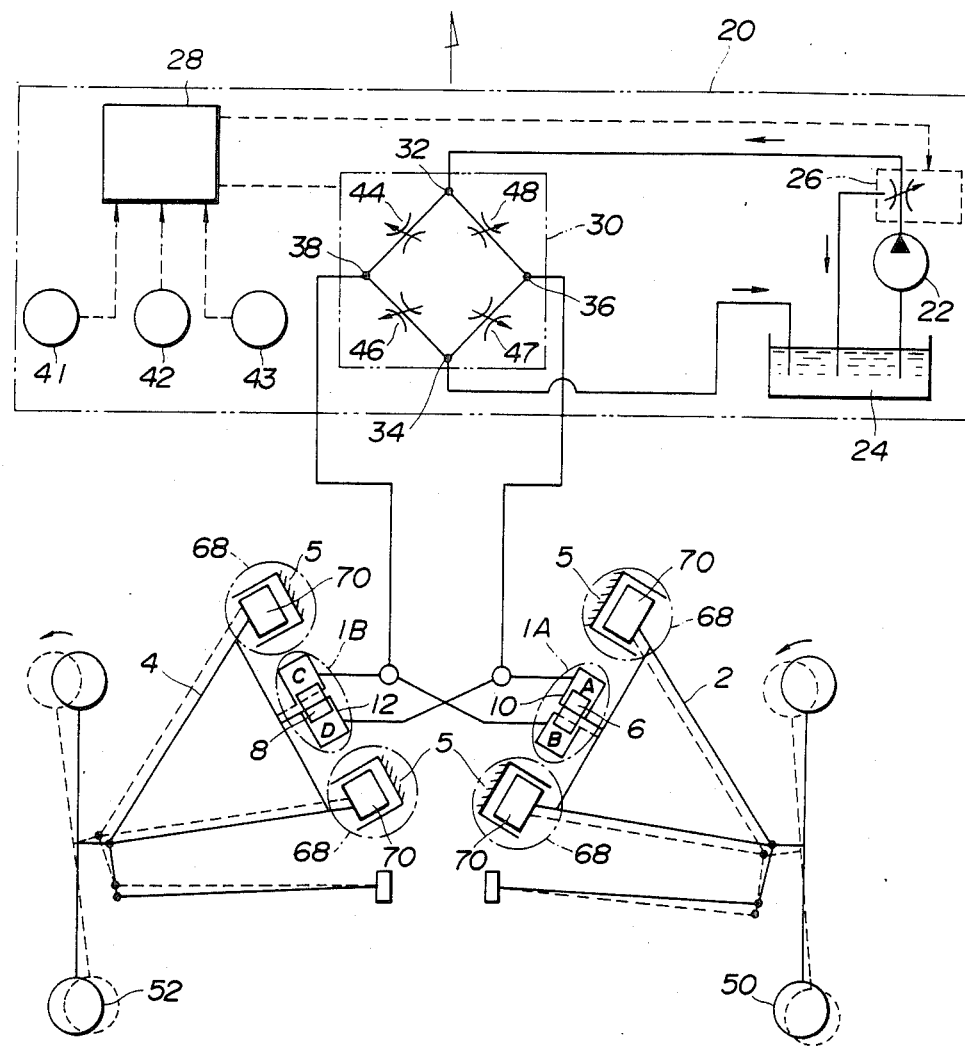
FIG. 4 is a schemmatic plan view of a control arrangement which forms part of the first embodiment of the present invention.

FIGS. 2 and 4 show a first embodiment of the present invention. In this arrangement hydraulic servos 1A and 1B are arranged to interconnect each of the suspension 2, 4 arms with the vehicle chassis via a structural member 5 which is mounted thereon via insulators 7. These servos 1A, 1B are arranged to include pistons 6, 8 which divide housings 10, 12 into variable volume chambers A and B and C and D, respectively. The suspension arms 2, 4 are connected to the pistons 6, 8 (see FIG. 2) so that when the arms 2, 4 move with respect to the chassis 5 the pistons 6, 8 rotates about axes which are aligned with the axes of the tubular shafts 14 on which the elastomeric bush bodies 16 of the suspension are disposed. Alternatively, it is possible that the projections 18 which extend from the suspension arms to the pistons 6, be pivotally connected thereto to permit suitable relative movement between the arms and structural member 5.

The first embodiment includes a hydraulic control circuit arrangement 20 which includes a pump 22 which inducts hydraulic fluid from a reservoir 24 and discharges the same via a pressure regulator valve 26 which includes a variable orifice/drain arrangement. The pressure of the fluid discharged is controlled by the pressure regulator valve 26 in accordance with a control signal outputted by an electronic control circuit 28.

A control valve 30 has an input port 32 which receives the modulated discharge from the pressure regulator valve 26, a drain port 34 which fluidly communicates with the reservoir and control pressure ports 36, 38 which are connected with chambers A, D and B, C respectively.

The electronic control circuit 28 receives data inputs from a first G sensor 41 which senses the forward acceleration of the vehicle, a second G sensor 42 which senses the lateral acceleration of the vehicle and a vehicle speed sensor 43. However, it should be noted that the data inputs may further include signals indicative of the rate at which the accelerator pedal is being depressed, the application of the vehicle brakes and the like if so desired.

In accordance with the data input the pressure regulator valve 26 is operated to vary the pressure delivered to the inlet port 32.

In FIG. 4 the control valve 30 is illustrated as functionally comprising four variable orifices 44, 45, 46 and 47. Viz., with this valve arrangement by throttling orifices 44 and 47 and opening orifices 46, 48 the pressurized hydraulic fluid from the regulator valve 26 is fed to chambers A and D while chambers B and C are drained via drain port 34. By reversing the conditioning of the orifices the reverse situation wherein chambers B, C are pressurized and chambers A, D are drained, may be obtained.

In FIG. 4 the situation wherein the vehicle is traversing a curve which turns to the left and wherein chambers A and D are pressureized is illustrated. Under these circumstances the rear road wheels 50, 52 are induced to move from the orientations shown in solid line to those shown in chain line. Accordingly, the outboard rear wheel 50 is induced to undergo "toe in" while the inboard one 52 is caused to "toe-out".

By varying the level of discharge from regulator valve 26 and/or the amount of throttling and opening of the valves 44-48 the amount of rear wheel orientation correction may be selectively varied in manner to exactly meet the instant understeer requirements.

Figure 7:
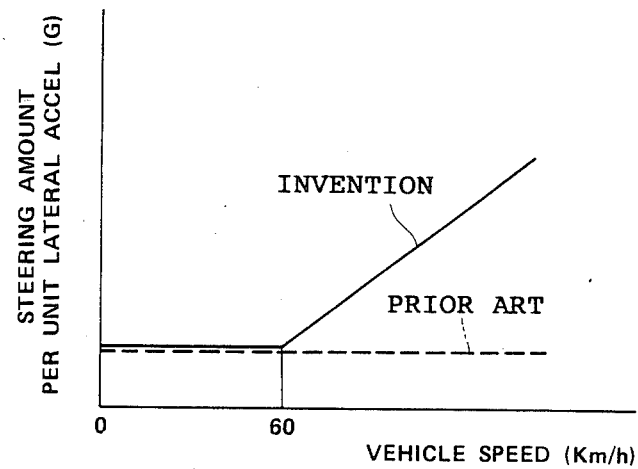
FIG. 7 is a graph showing in terms of (a) the amount steering produced by lateral acceleration and (b) vehicle speed, the control characteristics possible with the present invention.
Figure 8:
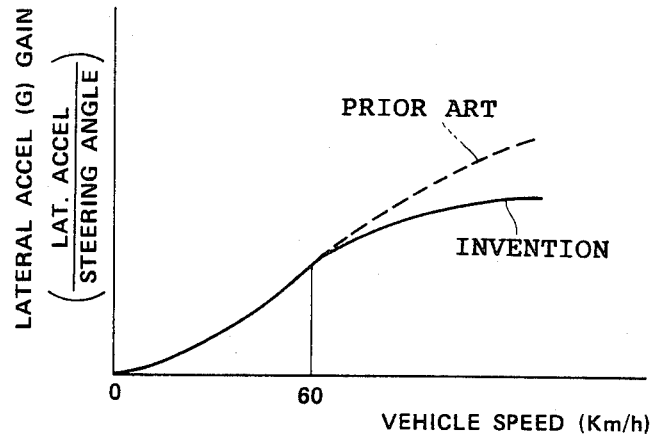
FIG. 8 is a graph showing in terms of (a) gain and (b) vehicle speed, further control characteristics possible with the present invention

FIGS. 7 and 8 show the difference between the characteristics obtained with the prior art and those obtained with the present invention. In these drawings the chain line traces denote the prior art characteristics while the solid line ones denote those obtained with the first embodiment.

Figure 5:
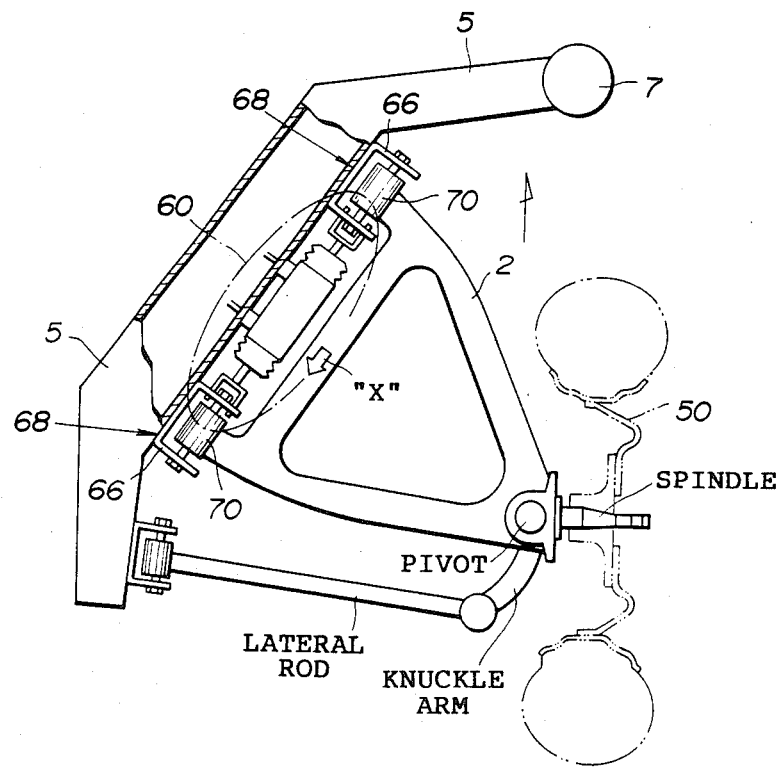
FIG. 5 is a plan view of a suspension including a second embodiment of the present invention.
Figure 6:
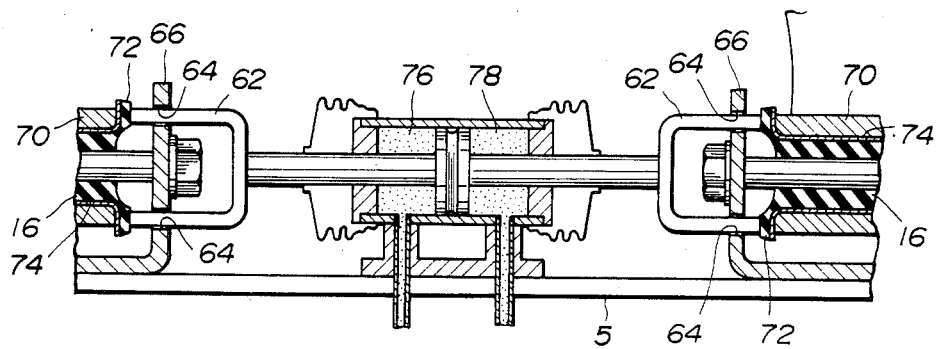
FIG. 6 is a sectional view of the hydraulic servo device utilized in the second embodiment.

FIGS. 5 and 6 show a second embodiment of the present invention. This arrangememt differs from the first one in that the hydraulic servo takes the form of a struts 60, 60' (only strut 60 is illustrated) which is fixed to the structural member 5 and arranged to have bifurcate fork-like extensions 62 which pass through apertures 64 formed in the brackets 66 of the hinge units 68 which interconnect the suspension arms and the structural member 5. With this arrangement the ends of the bifurcate "forks" 62 can move toward and bear against the axial ends of the cylindrical housing porions 70 of the suspension arms in which the elastomeric bodies are disposed.

Figure 1:
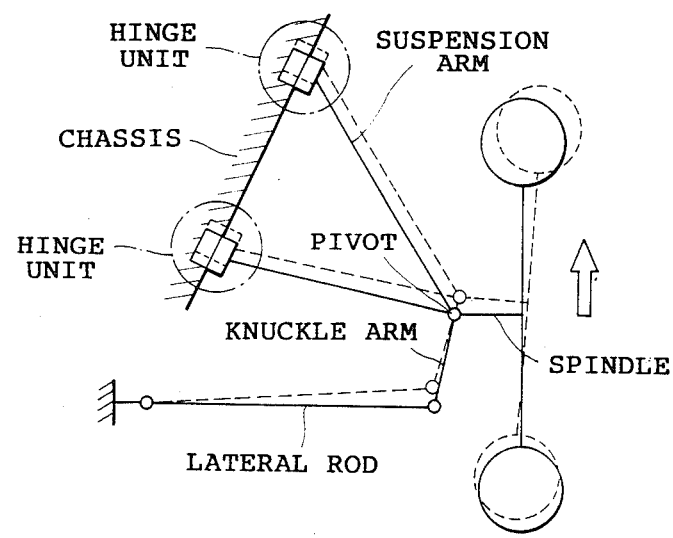
FIG. 1 is a schematic illustration of the prior art suspension discussed briefly in the opening paragraphs of the instant disclosure.
Figure 3:
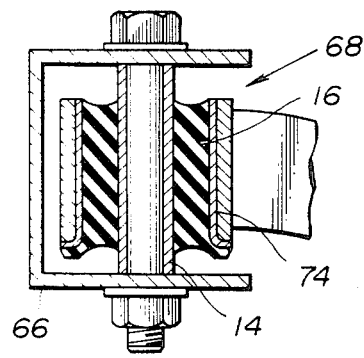
FIG. 3 is a sectional view of a bushing which forms part of the suspension to which the present invention is applied.

In this embodiment the elastomeric bush bodies 16 are formed with flanges and are housed within cylindrical holders 74 having corresponding flange portions (see FIG. 3). With this contstruction noise generating impacts between the fork ends and the suspension are prevented. To prevent abrasion of the elastomeric flanges 72 the forks 62 are preferably arranged to be rotatable and for the apertures 64 through which they pass be arcuate and sufficiently long to permit the forks 62 to rotate in accordance with the movement of the suspension arms.

With this arrangement by selectively pressurizing the chambers 76, 78 and 76', 78' of the struts 60, 60' the elastomeric bodies 16 can be biased in a manner to distort in the axial direction thereof and therefore bring about a situation which produces the same effect as that shown in FIG. 4.

Figure 9:
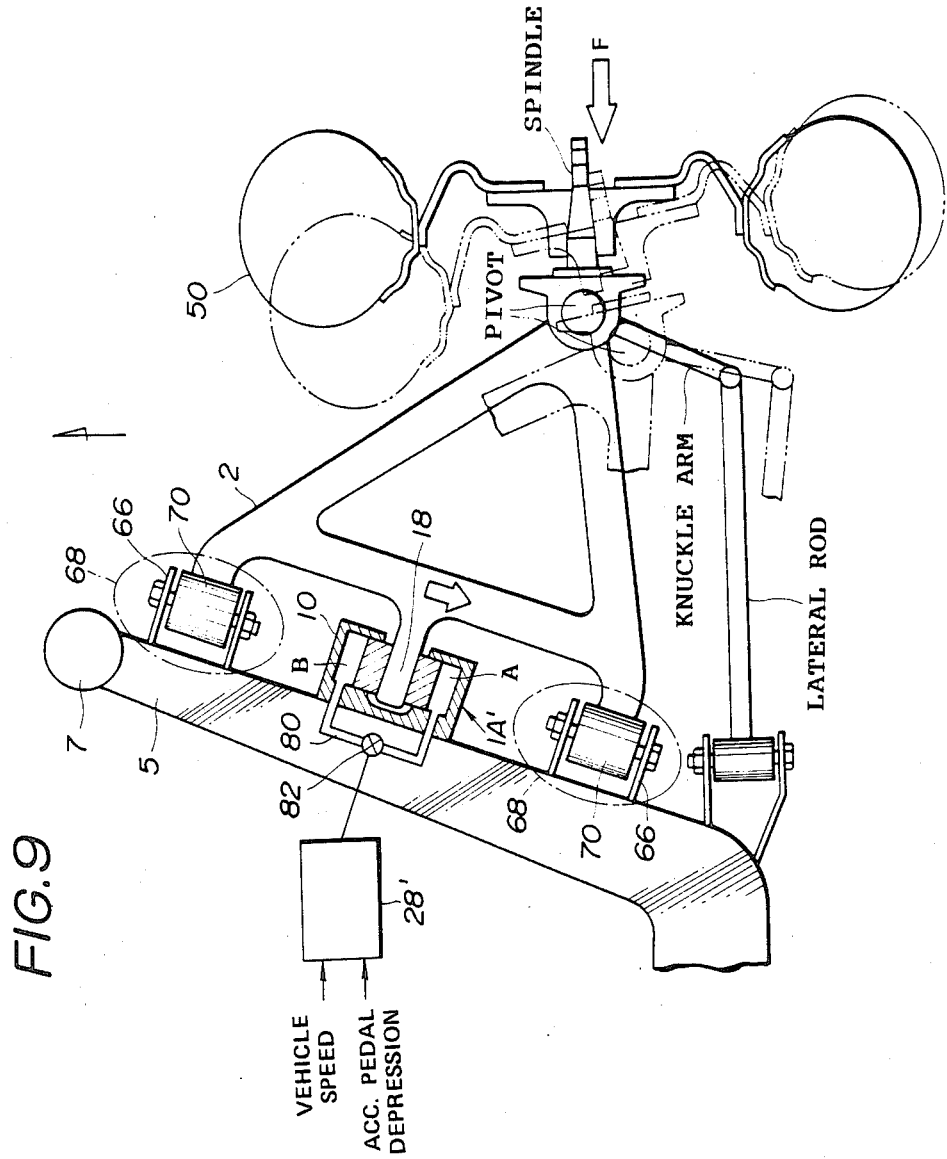
FIG. 9 is a plan view partially in section of a suspension including a third embodiment of the present invention.
Figure 10:
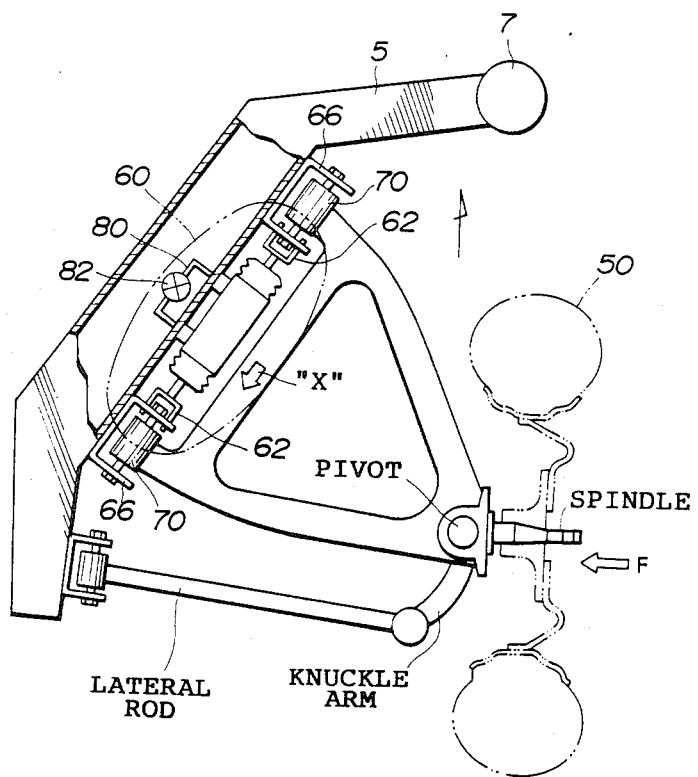
FIG. 10 is a plan view of a suspension including a fourth embodiment of the present invention.

FIG. 9 shows a third embodiment of the present invention. This embodiment features a simplified hydrualic control arrangement wherein the chambers A, B of the servo-like device 1A' are interconnected by a conduit and valve arrangement 80, 82 which, rather than selectively pressurizing the same, simply selectively permits and prevents fluid communication between the two chambers A and B. As will be appreciated, as the hydraulic fluid which fills the chambers and conduit, is essentially incompressible, once the communication between the chambers is cut-off movement of the suspension arm in the direction shown by bold arrow "X" is severely limited and thus "hardens" the suspension against distortion which induces the tendancy for compliance steer to occur and thus limits the amount of understeer which can be produced.

With this embodiment it is advantageous to select the elastomer from which the bush bodies 16 are formed in a manner which will permit sufficient deflection at high speeds to achieve the desired amount of understeer thereat. With this selection, by closing the valve 82 at low vehicle speeds the amount of deflection of the bushes can be suitably limited in a manner which causes the same to behave as though they were formed of a harder elastomer and thus produce a suitably reduced amount of understeer at low vehicle speeds. In this embodiment valve 82 is controlled by a control circuit 28' which is responsive to signals indicative of vehicle speed and load (i.e accelerator pedal depression or the like)

Figure 11:
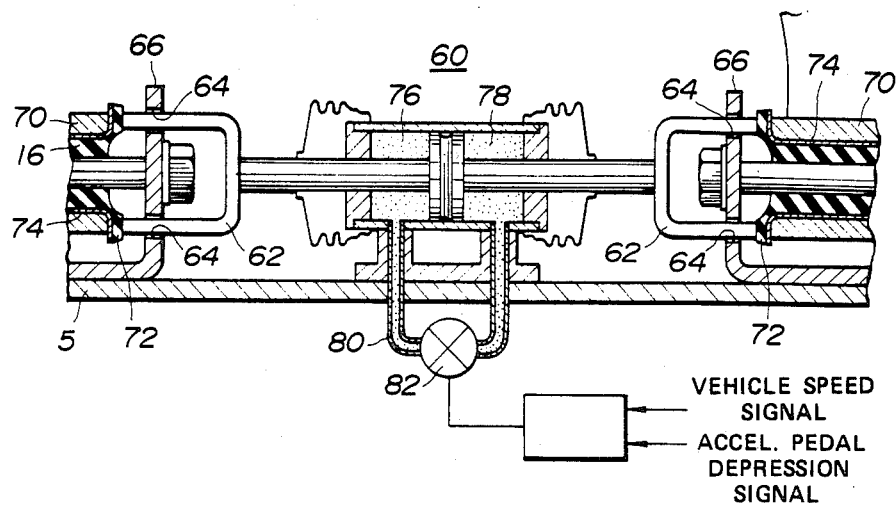
FIG. 11 is a sectional elevation of the hydraulic strut arrangement used in the forth embodiment.

FIG. 11 shows a fourth embodiment of the present invention. This arrangement is basically similar in construction to the second embodiment disclosed hereinbefore. However, this arrangement like the third embodiment is arranged so that the chambers of the hydraulic struts 60, 60' are connected via valve 82 and conduit 80 such as used in the third embodiment.

Since the operation of this embodiment wil be apparent in view of the preceeding disclosure no further discription will be given for brevity.

Figure 12:
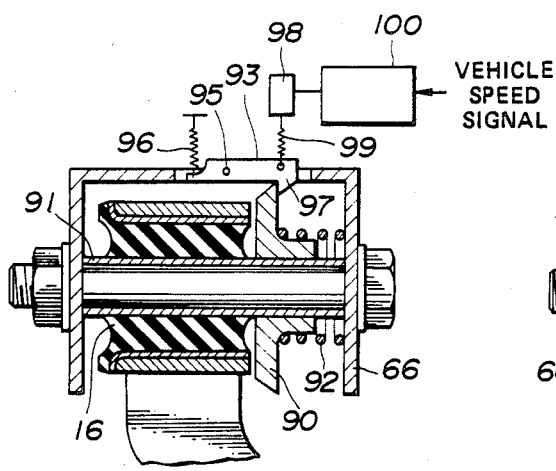
FIGS. 12 and 13 are sectional views of a mechanical actuator device which characterizes a fifth embodiment of the present invention.
Figure 13:
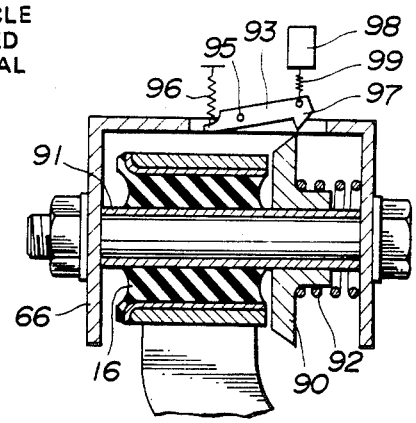

FIGS. 12 and 13 show a fifth embodiment of the present invention. This arrangement features a mechanical control arrangement wherein the distortion of the elastomeric body 16 in the axial direction is limited by the provision of an annular stopper 90 which is slidably disposed on an elongate tubular shaft 91 of the hinge units 68. This stopper 90 is biased toward one axial end of the bush arrangement by a relatively small spring 92. A latch-like lever or pawl 94 is arranged to be biased to rotate about a pivot 95 by a return spring 96 to a position wherein the tooth 97 thereof engages the outer periphery of the annular stopper 90 in a manner which prevents movement thereof away from the bush arrangement. The lever 93 is operatively connected to an actuator 98. In this embodiment the connection takes the form of a spring 99. However, the means of connection is not limited to resilient elements and may take a form of a linkage or similar rigid arrangement.

When a control circuit 100 receives a vehicle speed signal which indicates that the vehicle is travelling at or above a predetermined speed, actuator 98 is triggered to withraw the lever 93 from its locking position (see FIG. 13) and thus permit the maximum amount of deflection of the elastomeric body 16 to increase in manner which increase the amount of understeer produced.

That is to say, with the fifth embodiment while the lever 93 is permitted to remain in the position shown in FIG. 12 then the amount of deflection which the elastomeric body 16 can undergo is limited and thus limits the amount of understeer which can be produced.

The edge of the annular stopper 90 is formed with a chamfer which cooperates with an inclined surface formed on the lever 93 in a manner that when the vehicle speed lowers and the actuator 98 is de-energized, spring 92 biases the stopper in a manner that upon the elastomeric body 16 assuming a relaxed state or being distored in a direction away from the stopper, the stopper moves to a position wherein it becomes latched in position by the lever 93. Thus, with this embodiment the limiting action of the stopper 90 is soon re-established after the vehicle speed drops below the level at which the actuator 98 is de-energized and thus quickly re-establishes the limiting action which ensures the desired low vehicle speed suspension characteristics.

The above described embodiments are illustrative of the invention which may be modified with the scope of the appended claims.

What is claimed is:

1. In a vehicle having a chassis
a rear suspension comprising:
a rear suspension arm;
hinge means for interconnecting said rear suspension arm to said chassis, said hinge means including an elastomeric bush which distorts when the vehicle is subject to a lateral force;
a lateral rod pivotally connected at its inboard end to an essentially immovable portion of said chassis;
a knuckle arm pivotally connected to the outboard end of said lateral rod;
a spindle on which a rear road wheel of the vehicle is supported;
means for mounting said spindle on said suspension arm so to be pivotal about an axis which permits the road wheel to be steered and the amount of one of the toe-in and the toe-out of the road wheel to be varied;
said knuckle arm being connected to said pivotally mounting means for varying the orientation of said spindle with respect to said chassis upon the vehicle being subject to a lateral force in a manner which steers the road wheel;
a sensor responsive to a vehicle operational parameter; and
means responsive to said sensor for modifying the distortion of said elastomeric bush and thus varying the steering of said road wheel by said lateral rod and said knuckle arm.

2. A rear suspension as claimed in claim 1, wherein said sensor responsive means takes the form of:
a hydraulic servo comprising:
a housing secured to the chassis;
a piston disposed in said housing to define first and second hydraulic chambers, said piston being operatively connected to said suspension arm;
a control circuit, said control circuit being responsive to an output of said sensor;
a source of hydraulic fluid under pressure, said source being responsive to a control signal from said control cricuit in a manner to vary the level of hydraulic pressure discharge therefrom;
a control valve, said control valve being responsive to said control circuit in a manner to selectively supply said first and second hydraulic chambers with fluid under pressure.

3. A rear suspension as claimed in claim 1, wherein said sensor responsive means takes the form of:
a hydraulic servo comprising:
a housing secured to the chassis;
a piston disposed in said housing to define first and second hydraulic chambers;
a rod connected with said piston, said rod being engageable with said elastomeric bush in a manner which applies a bias in a direction which is essentially coaxial with the axis of said hinge means and which tends to distort said bush in a predetermined manner;
a control circuit, said control circuit being responsive to an output of said sensor;
a source of hydraulic fluid under pressure, said source being responsive to a control signal from said control circuit in a manner to vary the level of hydraulic pressure discharge therefrom;
a control valve, said control valve being responsive to said control circuit in a manner to selectively supply said first and second hydraulic chambers with fluid under pressure.

4. A rear suspension as claimed in claim 1, wherein said sensor responsive means takes the form of:
a housing secured to the chassis;
a piston disposed in said housing to define first and second hydraulic chambers, said piston being connected to said suspension arm;
a control circuit, said control circuit being responsive to an output of said sensor;
a passage which exclusively provides fluid communication between said first and second hydraulic chambers; and
a control valve disposed in said passage which selectively permits and prevents fluid communication between said first and second hydraulic chambers, said control valve being responsive to said control circuit in a manner to prevent fluid communication between said first and second hydraulic chambers in the event that said sensor indicates that the vehicle is operating in a mode wherein the amount of distortion of said elastomeric bush should be limited.

5. A rear suspension as claimed in claim 1, wherein said sensor responsive means takes the form of:
a housing secured to the chassis;

a piston disposed in said housing to define first and second hydraulic chambers;

a rod connected to said piston, said rod being engageable with said elastomeric bush in a manner which applies a bias which tends to distort said elastomeric bush in a predetermined manner;

a control circuit, said control circuit being responsive to an output of said sensor;

a passage which exclusively provides fluid communication between said first and second hydraulic chambers; and a control valve disposed in said passage which selectively permits and prevents fluid communication between said first and second hydraulic chambers, said control valve being responsive to said control circuit in a manner to prevent fluid communication between said first and second hydraulic chambers in the event that said sensor indicates that the vehicle is operating in a mode wherein the amount of distortion of said elastomeric bush should be limited.

6. A rear suspension as claimed in claim 1, wherein said axis is a king pin axis.

7. A rear suspension as claimed in claim 6, wherein said bush of said hinge means is disposed in a first member the axis of which member is coaxial with the axis of said hinge means and wherein said hydraulic unit is arranged to apply a force which acts in the direction of axis of said first member on which the bush member is disposed, and wherein said rear suspension further comprises a second hinge means for interconnecting said rear suspension arm to said chassis, said second hinge means including a second elastomeric bush which distorts when said vehicle is subject to a lateral force, said second elastomeric bush being disposed on a second member which is essentially coaxial with said first member.

8. In a vehicle having a chassis
a rear suspension comprising:
a suspension arm;
hinge means for interconnecting said suspension arm to said chassis, said hinge means including an elastomeric bush which distorts when the vehicle is subject to a lateral acceleration;
a lateral rod pivotally connected with said chassis;
a knuckle arm pivotally connected to the outboard end of said lateral rod;
a spindle on which a road wheel is supported;
means for pivotally mounting said spindle on said suspension arm;
said knuckle arm being connected to said pivotally mounting means for varying the orientation of said spindle with respect to said chassis upon the vehicle being subject to a lateral acceleration in a manner which steers the road wheel;
a sensor responsive to a vehicle operational parameter; and means responsive to said sensor for modifying the distortion of said elastomeric bush and thus varying the steering of said road wheel by said lateral rod and said knuckle arm including
a stopper member movably disposed adjacent said elastomeric bush;
a device for selectively locking said stopper member in a predetermined location with respect to said elastomeric bush in a manner which limits the distortion of said elastomeric bush in a predetermined direction, said device being responsive to said sensor for releasing said stopper and permitting the same to move in said predetermined direction.

9. A rear suspension as claimed in claim 8, further comprising:
a spring which biases said stopper member in a direction opposite said predetermined one:
said device and said stopper member being formed with an arrangement which permits said stopper to be locked in said predetermined position under the influence of said spring when said elastomeric bush is not being distorted in said predetermined direction and said sensor indicates that the vehicle is operating in a manner wherein the amount of distortion of said elastomeric bush should be limited in said predetermined direction.

10. In a vehicle having a chassis
a rear suspension comprising:
a rear suspension arm;
first and second hinge means for interconnecting said rear suspension arm to said chassis, said first and second hinge means having essentially coaxially aligned axes and including firrst and second elastomeric bushes respectively, said first and second bushes undergoing distortion in the direction of said axes when the vehicle is subject to a lateral force;
a lateral rod pivotally connected at its inboard end to an essentially immovable portion of said chassis;
a knuckle arm pivotally connected to the outboard end of said lateral rod;
a spindle on which a rear road wheel of the vehicle is supported;
means for mounting said spindle on said suspension arm so as to be pivotal about a king pin axis;
said knuckle arm being connected to said pivotally mounting means for controlling the orientation of said spindle with respect to said chassis upon the vehicle being subject to a lateral force in a manner which varies one of the toe-in and toeout of the road wheel;
a sensor responsive to a vehicle operational parameter; and
means responsive to said sensor for varying the amount of distortion that said first and second bushes can undergo.

* * * * *